(12) United States Patent
Cletheroe et al.

(10) Patent No.: US 9,914,066 B2
(45) Date of Patent: Mar. 13, 2018

(54) ELECTROMAGNETICALLY COUPLED BUILDING BLOCKS

(71) Applicant: Microsoft Technology Licensing, LLC, Redmond, WA (US)

(72) Inventors: Daniel Cletheroe, Cambridge (GB); Greg Saul, Cambridge (GB); Nicolas Villar, Cambridge (GB); Oscar Salandin, Cambridge (GB); Haiyan Zhang, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/063,258

(22) Filed: Mar. 7, 2016

(65) Prior Publication Data
US 2017/0252664 A1    Sep. 7, 2017

(51) Int. Cl.
  *A63H 33/04*   (2006.01)
(52) U.S. Cl.
  CPC ......... *A63H 33/042* (2013.01); *A63H 33/046* (2013.01); *A63H 2200/00* (2013.01)
(58) Field of Classification Search
  USPC .......... 434/156, 169, 176; 446/91, 117, 124, 446/175, 484
  See application file for complete search history.

(56) References Cited

U.S. PATENT DOCUMENTS 6,062,937 A * 5/2000 Kikuchi ............... A63H 33/042
                                                446/484
6,204,764 B1   3/2001 Maloney
6,443,796 B1 * 9/2002 Shackelford ......... A63H 33/042
                                                273/237
6,454,624 B1 * 9/2002 Duff .................... A63H 33/042
                                                414/915
6,773,322 B2 * 8/2004 Gabai .................... A63H 30/04
                                                446/175

(Continued)

FOREIGN PATENT DOCUMENTS

CN   104992595 A   10/2015
EP    1271415 A1    1/2003

(Continued)

OTHER PUBLICATIONS

U.S. Appl. No. 14/931,049, Villar et al., "Multi-modal sensing surface," filed Nov. 3, 2015, 40 pages.

(Continued)

*Primary Examiner* — Kurt Fernstrom

(57) ABSTRACT

A building block is described which has a plurality of faces each with an associated coupling element, such that a first coupling element is adjacent to a first face and a second coupling element is adjacent to a second face, etc. An RF switch in the block is arranged to selectively couple two of the coupling elements together under the control of a processor. The processor controls the RF switch in response to signals received from a transceiver module. A sensing and switching arrangement within the building block selectively connects the processor to one of the coupling elements based on a detected orientation of the block (e.g. so that power harvested from the transceiver module can be used to power the processor). The coupling elements are either all antennas or all electrodes.

20 Claims, 11 Drawing Sheets

(56) References Cited

U.S. PATENT DOCUMENTS

| | | | |
|---|---|---|---|
| 6,834,251 | B1 | 12/2004 | Fletcher |
| 7,439,972 | B2 | 10/2008 | Timcenko |
| 7,821,274 | B2 | 10/2010 | Philipp et al. |
| 8,079,890 | B2 * | 12/2011 | Seligman ............. A63H 33/042 446/118 |
| 8,257,157 | B2 | 9/2012 | Polchin |
| 8,743,086 | B2 | 6/2014 | Chen et al. |
| 8,970,537 | B1 | 3/2015 | Shepelev et al. |
| 9,168,464 | B2 * | 10/2015 | Karunaratne ........ A63H 33/086 |
| 2002/0185981 | A1 | 12/2002 | Dietz et al. |
| 2002/0196250 | A1 | 12/2002 | Anderson et al. |
| 2003/0148700 | A1 * | 8/2003 | Arlinsky ............... A63H 33/04 446/91 |
| 2009/0029771 | A1 | 1/2009 | Donahue |
| 2009/0167699 | A1 | 7/2009 | Rosenblatt et al. |
| 2010/0001923 | A1 * | 1/2010 | Zilber ..................... A63F 13/80 345/1.1 |
| 2010/0267421 | A1 | 10/2010 | Rofougaran |
| 2011/0273382 | A1 | 11/2011 | Yoo et al. |
| 2012/0162032 | A1 | 6/2012 | Yang et al. |
| 2012/0258436 | A1 * | 10/2012 | Lee ......................... G09B 19/00 434/362 |
| 2013/0181937 | A1 | 7/2013 | Chen et al. |
| 2013/0194071 | A1 | 8/2013 | Slogedal et al. |
| 2013/0196596 | A1 | 8/2013 | Parekh et al. |
| 2013/0217295 | A1 | 8/2013 | Karunaratne |
| 2014/0043248 | A1 | 2/2014 | Yeh et al. |
| 2014/0092054 | A1 | 4/2014 | Ng |
| 2014/0176819 | A1 | 6/2014 | Yilmaz |
| 2014/0340347 | A1 | 11/2014 | Tenuta |
| 2015/0049063 | A1 | 2/2015 | Smith et al. |
| 2015/0220184 | A1 | 8/2015 | Park et al. |
| 2015/0242012 | A1 | 8/2015 | Petcavich et al. |
| 2015/0258435 | A1 | 9/2015 | Zhang et al. |
| 2016/0043752 | A1 | 2/2016 | Slater et al. |
| 2016/0101370 | A1 * | 4/2016 | Madsen ............... A63H 33/042 446/91 |

FOREIGN PATENT DOCUMENTS

| | | |
|---|---|---|
| EP | 2620845 | 7/2013 |
| EP | 2741183 | 6/2014 |
| WO | 2010150232 A1 | 12/2010 |

OTHER PUBLICATIONS

Chan et al., "CapStones and ZebraWidgets: Sensing Stacks of Building. Blocks, Dials and Sliders on Capacitive Touch Screens," In Proceedings of the SIGCHI Conference on Human Factors in Computing Systems, May 5, 2012, pp. 2189-2192.

Goh et al., "The i-Cube: Design Considerations for Block-based Digital Manipulatives and Their Applications," In Proceedings of Designing Interactive Systems Conference, Jun. 11, 2012, 10 pages.

Jennings et al., "CONSTRUCT/VizM: A Framework for Rendering Tangible constructions," In Proceedings of the 14th Congress of the Iberoamerican Society of Digital Graphics, Nov. 17, 2010, pp. 415-418.

Kitamura et al., "Real-time 3D Interaction with ActiveCube," In Proceedings of Extended Abstracts on Human Factors in Computing Systems, Mar. 31, 2001, pp. 355-356.

Kramer, "Moveable Objects, Mobile Cod," In Master's Thesis, Retrieved on: Dec. 2, 2015, pp. 1-29.

Kranz et al., "A Display Cube as a Tangible User Interface," In Proceedings of the Seventh International Conference on Ubiquitous Computing, Sep. 11, 2005, 2 pages.

"Lego Shop," Retrieved on: Dec. 4, 2015, Available at <<http://shop.lego.com/en-US/Lego-Fusion-Battle-Towers-21205>> 2 pages.

"Modular Robotics," Retrieved on: Dec. 4, 2015, Available at <<http://www.modrobotics.com/cubelets/>> 17 pages.

Saenz, "Siftables are Changing the Shape of Computing," Published on: May 5, 2010, Available at <<http://singularityhub.com/2010/05/05/siftables-are-changing-the-shape-of-computing/>> 4 pages.

Schweikardt et al., "roBlocks: a robotic construction kit for mathematics and science education," In Proceedings of the 8th international conference on Multimodal interfaces, Nov. 2, 2006, pp. 72-75.

Watanabe et al., "The soul of ActiveCube: implementing a flexible, multimodal, three-dimensional spatial tangible interface," In Proceedings of the ACM SIGCHI International Conference on Advances in computer entertainment technology, Jun. 3, 2004, pp. 173-180.

"International Search Report and Written Opinion Issued in PCT Application No. PCT/US17/019796", dated Jun. 06, 2017, 11 Pages. (MS#358956-WO-PCT).

U.S. Appl. No. 14/931,049, Office Action dated Apr. 7, 2017, 19 pages.

U.S. Appl. No. 14/931,049, Amendment and Response filed Jun. 15, 2017, 16 pages.

U.S. Appl. No. 14/931,049, Office Action dated Oct. 4, 2017, 25 pages.

PCT International Search Report and Written Opinion in International Application PCT/US2016/059804, dated Jan. 30, 2017, 14 pages.

Kim et al., "A highly sensitive capacitive touch sensor integrated on a thin-film-encapsulated active-matrix OLED for ultrathin displays", in Proceedings of IEEE Transactions on Electron Devices, vol. 58, Issue 10, Oct. 2011, pp. 3609-3615.

PCT 2nd Written Opinion in International Application PCT/US2016/059804, dated Oct. 12, 2017, 6 pages.

* cited by examiner

ELECTROMAGNETICALLY COUPLED BUILDING BLOCKS

BACKGROUND

Some existing modular interactive toys (such as construction sets or modular figurines) use a camera to scan the assembly of blocks, determine the configuration that the user has assembled and then digitize the construction in a digital software application. This, however, suffers from occlusion because only those blocks which are visible can be sensed and hence represented in the virtual version of the construction.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A building block is described which has a plurality of faces each with an associated coupling element, such that a first coupling element is adjacent to a first face and a second coupling element is adjacent to a second face, etc. An RF switch in the block is arranged to selectively couple two of the coupling elements together under the control of a processor. The processor controls the RF switch in response to signals received from a transceiver module. A sensing and switching arrangement within the building block selectively connects the processor to one of the coupling elements based on a detected orientation of the block (e.g. so that power harvested from the transceiver module can be used to power the processor). The coupling elements are either all antennas or all electrodes.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
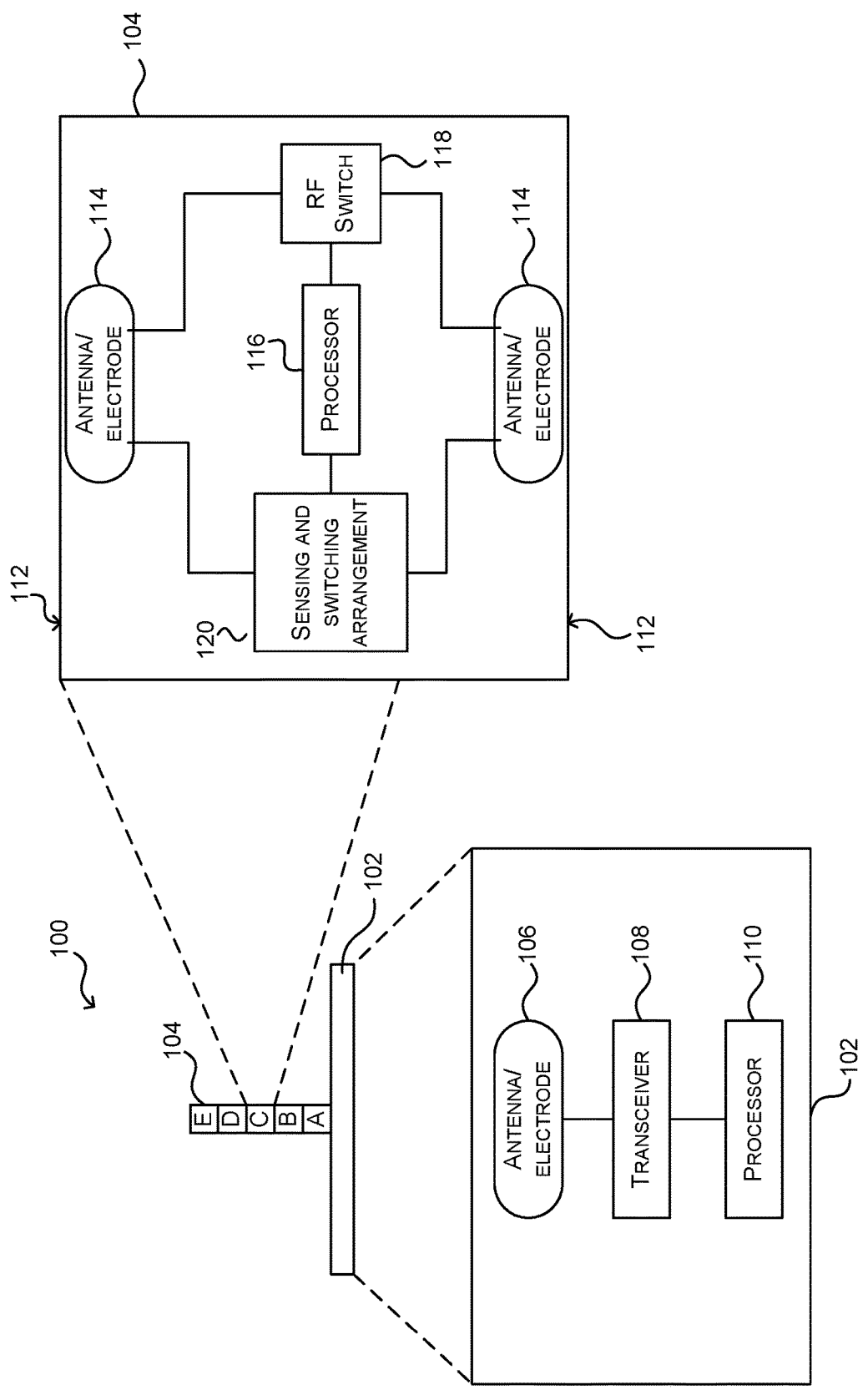
FIG. 1 is a schematic diagram of an example modular construction system comprising a transceiver module and a plurality of blocks.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As described above, where a camera system is used to detect the configuration of an assembly of blocks or modules created by a user, only those blocks which are visible can be sensed. In an alternative system, each block may include a processor and communicate with adjacent blocks via electro-mechanical connectors which transmit power and data between adjacent blocks. In this way, each block may identify its neighbors and this may then be used by a software application to create the virtual version of the user's construction. The electro-mechanical connectors can, however, be a common point of failure (particularly as these blocks may be roughly handled by children).

The embodiments described below are not limited to implementations which solve any or all of the disadvantages of known modular interactive toys.

Described herein is a modular construction system comprising a plurality of blocks and a transceiver module which may, for example, be a dedicated hardware module or a smart phone or tablet computer. In the system described herein, the blocks do not rely upon direct electrical connections between them to pass data and power (e.g. there are no exposed electrical contacts on a face of one block which make contact with corresponding exposed electrical contacts on another block) but instead electromagnetic induction coupling (e.g. inductive or capacitive coupling) or electromagnetic radiation coupling (e.g. short range wireless technologies) is used to transfer both data and power. The use of non-contact coupling, as described herein, increases reliability of the blocks and the system as a whole (e.g. because there are no exposed electrical connections which are susceptible to dirt, corrosion or damage), particularly where the blocks may receive rough handling (e.g. from children). Furthermore, all blocks in an assembly of blocks can be detected (i.e. there is no problem of occlusion as is the case for camera-based systems).

To achieve this non-contact (or non-galvanic) coupling, each block comprises two or more coupling elements (i.e. antennas or electrodes) with different coupling elements (i.e. different antennas/electrodes) being positioned adjacent to different faces of the block (e.g. a first antenna/electrode may be adjacent to a first face, a second antenna/electrode may be adjacent to a second face, a third antenna/electrode may be adjacent to a third face, etc.). When a block is adjacent to another block and receiving power from that block via a coupling element (i.e. via one of the two or more coupling elements), that coupling element may be referred to as the 'input coupling element. Similarly, when a block is also adjacent to a further block and is passing power (received via the input coupling element) to that further block via a different coupling element (i.e. via a different one of the two or more coupling elements), that different coupling element may be referred to as the 'output coupling element.

Each block comprises a processor having an identifier which can be read by the transceiver module in order to determine the topology (or configuration) of an assembly of blocks that have been constructed by a user. Each block also comprises an RF switch which can be controlled remotely by the transceiver module (via the processor in the block) to selectively couple the input antenna/electrode to an output antenna/electrode in order to pass power through a chain of blocks and to enable the reading of the identifiers of each block. In many of the examples described herein, the individual blocks do not include a separate power source and so the processor in a block is only powered by harvesting power from an adjacent block via an antenna/electrode. Blocks use the removal of RF-coupling (and hence loss of power) to detect a disconnection event, and reset their state. In examples comprising blocks which are self-powered (e.g. by harvesting energy from a source, such as sunlight, or having an internal battery), such blocks comprises a separate reset mechanism which resets the state of the block when its configuration changes (e.g. a detector or microcontroller may be used to detect the loss of a proximate RF signal and reset the state of the block). The power that is passed along a chain of blocks is provided either by the transceiver module or in various examples by one or more dedicated 'power blocks'. By remotely controlling the RF switches in the blocks (via the processors in each block) the transceiver can perform topology detection in a centralized manner irrespective of whether a user places blocks one by one onto the transceiver module or the user places an already constructed arrangement of blocks onto the transceiver module.

Each block also comprises a sensing and switching arrangement which is arranged to selectively connect the processor in the block to an input antenna/electrode based on a detected orientation of the block (although all the antennas/electrodes in a block are potentially input antennas/electrodes, a maximum of one antenna/electrode is activated as an input antenna/electrode at any time). The orientation of a block may be defined with respect to gravity and/or with respect to an adjacent block and/or with respect to a power source, as shown in the various examples described below. This sensing and switching arrangement means that the blocks do not need to have a pre-defined 'top' face and 'bottom' face and so this increases the number of different ways that the blocks can be assembled. The sensing and switching arrangement also increases the reliability of the system (and in particular of the topology detection) because if the blocks are shaped so that they can be stacked in more than one orientation and the sensing and switching arrangement was omitted, a user could assemble blocks in such a way that the topology could never be detected (e.g. an error would occur) because the processor in a block would not be powered.

The term 'block' is used herein to refer to an object in the modular construction system and is not intended to imply that the block has any particular shape. Although many of the blocks are shown in the accompanying drawings as cubes/cuboids (as represented by squares/rectangles in two-dimensions) this is by way of example only and the blocks may have any 3D shape that comprises at least two mating features (e.g. flat sides, as shown in the examples, or a plug and socket arrangement) and within a modular construction system, the plurality of blocks may comprise blocks which are all identical in size and shape or a variety of blocks of different sizes and/or shapes. In various examples, the blocks may comprise surface features or other mechanisms (e.g. magnets) which enable adjacent blocks to be physically connected together (e.g. such that a force is required to separate them, other than the force required to lift a block against gravity) and in other examples, the blocks may not comprise any surface features or other mechanism for connecting blocks together (e.g. such that blocks may simply rest on top of each other). In examples where the blocks comprise surface features or another mechanism for physically connecting blocks together, the blocks may be able to connect in various orientations (e.g. such that there is no pre-defined 'top' face and no pre-defined 'bottom' face, unlike existing modular construction systems such as Lego™).

FIG. 1 is a schematic diagram of an example modular construction system 100 comprising a transceiver module 102 and a plurality of blocks 104 which are shown assembled in a vertical stack. In the example shown in FIG. 1, block A has been placed onto the transceiver module 102 and blocks B-D have been stacked on top of block A. The letters A-E are used herein to represent the identifiers (or IDs) of each of the blocks 104.

The transceiver module 102 shown in FIG. 1 comprises an antenna/electrode 106 (which may be referred to as the transceiver antenna/electrode), a transceiver 108 and a processor 110. As noted above, the transceiver module 102 may be a dedicated piece of hardware (e.g. a dedicated module within the modular construction system) or the transceiver module 102 may be a smart phone, tablet computer, games console or other computing device. In an example where the transceiver module 102 is a computing device, the antenna/electrode 106 may be an antenna/electrode in the computing device (e.g. an NFC antenna), the transceiver 108 may be a transceiver in the computing device (e.g. an NFC transceiver) and the processor 110 may be the CPU within the computing device. In another example, the transceiver module 102 may be a peripheral device which connects to a smart phone, tablet computer, games console or other computing device and in such examples, the transceiver module 102 may not include the processor 110 but instead the processor 110 shown in FIG. 1 may be part of the computing device (e.g. the CPU within the computing device).

Each of the plurality of blocks 104 comprises a plurality of faces 112, a plurality of antennas/electrodes 114, a processor 116, an RF switch 118 and a sensing and switching arrangement 120 (which may alternatively be referred to as an 'orientation module'). As noted above, the blocks 104 do not include a power source, although in various examples, a modular construction system may include further dedicated 'power blocks' which do include a power source in addition to the plurality of blocks 104 as shown in FIG. 1. These power blocks may be similar to the blocks described herein but additional comprise a power source such as a battery.

Figure 3:
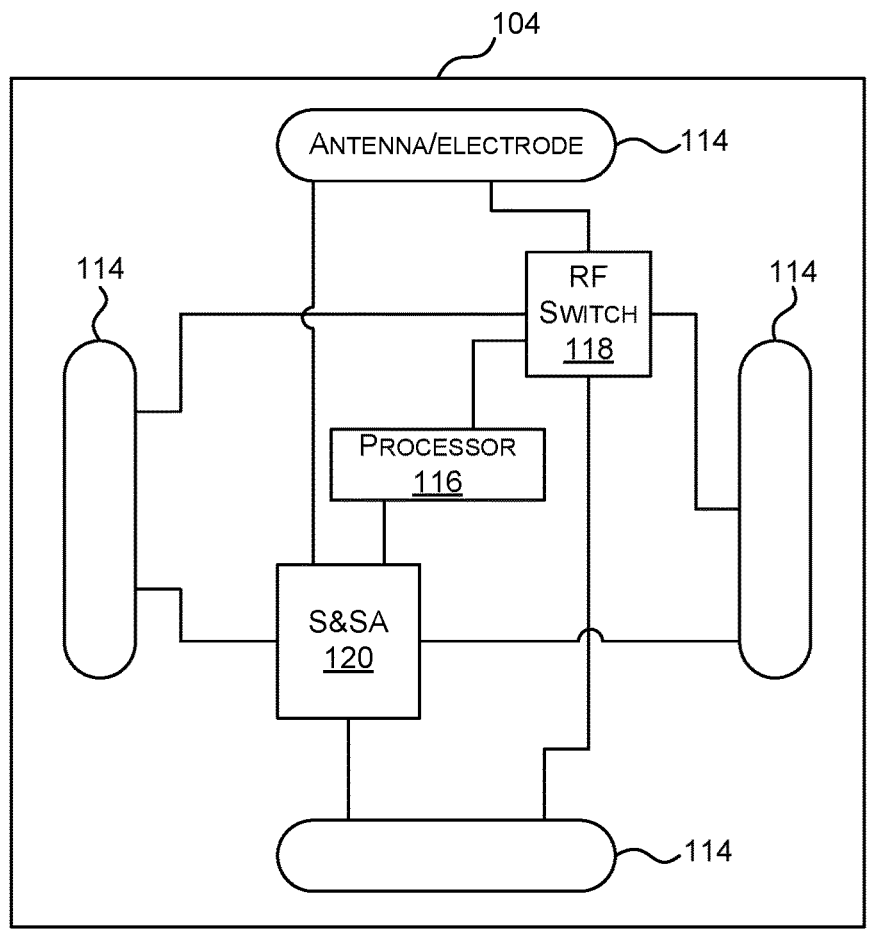
FIG. 3 is a schematic diagram of an example block comprising four antennas/electrodes.

As shown in FIG. 1, a first antenna/electrode 114 (from the plurality of antennas/electrodes) is adjacent to a first face 112 from the plurality of faces (e.g. the antenna/electrode 114 may be in a plane which is proximate to the first face 112 such that it is within coupling range of a corresponding antenna/electrode in an adjacent block when the two blocks are in contact) and a second antenna/electrode 114 (from the plurality of antennas/electrodes) is adjacent to a second face 112 from the plurality of faces. In various examples, the first antenna/electrode may be embedded within the first face and the second antenna/electrode may be embedded within the second face and the particular configuration of the antenna/electrode with respect to the adjacent face may be dependent upon the construction technique used to form the block 104 and the non-contact coupling method used (e.g. inductive/capacitive coupling or short-range wireless). Although FIG. 1 only shows two antennas/electrodes 114, it will be appreciated that a block may comprise more than two antennas/electrodes (e.g. one antenna/electrode per face as shown in FIG. 3). Furthermore, although the examples described herein show a single antenna/electrode per face, in other examples, there may be more than one antenna/electrode per face and this may provide further information about the topology of an assembly of blocks (e.g. such that the processor 110 could determine exactly where a block was placed on top of another block).

The configuration of each individual antenna/electrode 114 depends upon the type of coupling that is used to pass power between blocks 104. In various examples, the antennas/electrodes may be coils or loop antennas (e.g. where inductive coupling is used).

The RF switch 118 is arranged to selectively couple two of the antennas/electrodes 114 together (e.g. in response to an external control signal received via an input to the RF switch). In its default state, the RF switch 118 may be open such that it does not couple any antennas/electrodes 114 together and it may close in response to the external control signal. If the block comprises more than two antennas/electrodes 114, the RF switch 118 may be a multi-way switch and again in its default state it may not couple any antennas/electrodes 114 together and in response to an external control signal it may couple two of the antennas/electrodes 114 together. The block shown in FIG. 3 comprises a multi-way RF switch.

The processor 116, which may for example be a microcontroller (MCU) or NFC tag IC, has an identifier (e.g. which may be stored in the processor 116 or memory connected to the processor 116) where this identifier may, for example, be unique or be different from all other IDs within a particular modular construction system 100. The processor 116 is arranged to control the RF switch 118 in response to signals received from the transceiver module 102 and hence to cause the selective coupling of two of the antennas/electrodes 114. The processor 116 therefore generates the control signal for the RF switch 118 and an output of the processor 116 is connected to an input to the RF switch 118 such that the control signal can be passed from the processor 116 to the RF switch 118.

The sensing and switching arrangement 120 within a block 104 is arranged to detect the orientation of the block 104 (e.g. its orientation with respect to gravity or with respect to the transceiver module 102 or with respect to another block 104 in the system 100 or with respect to a power source) and based on the detected orientation of the block 104 to selectively connect the processor to one of the antennas/electrodes (e.g. to the input antenna/electrode). The sensing and switching arrangement 120 may comprise passive components (i.e. electronic components that do not require a source of power to perform their function) and/or active components (i.e. electronic components that do require a source of power to perform their function) and various different examples are described below.

Figure 2:
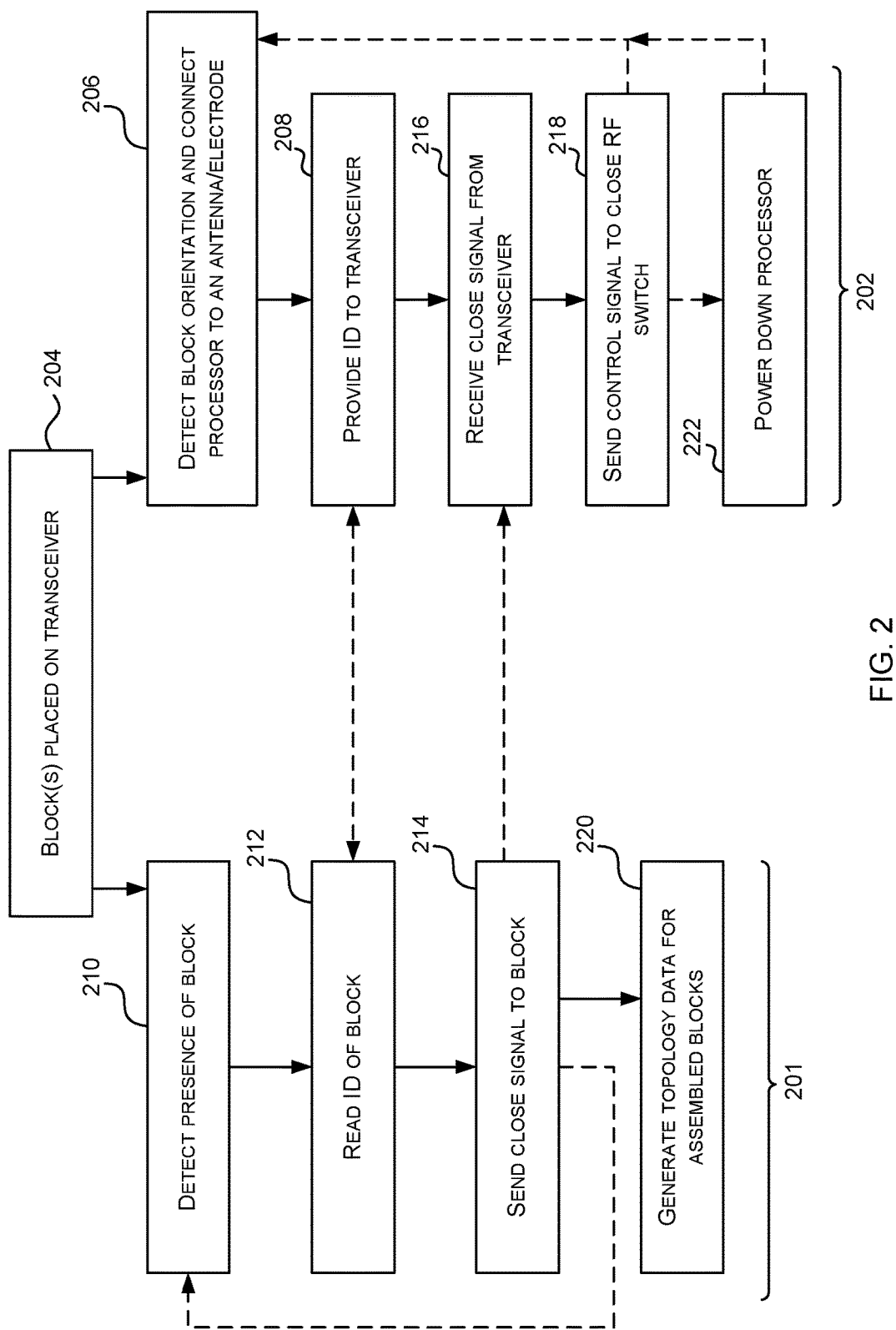
FIG. 2 is a flow diagram of an example method of operation of the system of FIG. 1.

The operation of the modular construction system 100 can be described with reference to FIG. 2. The example flow diagram of FIG. 2 shows the operation of the transceiver module 102 (as indicated by bracket 201) and the operation of each block 104 (as indicated by bracket 202). The method is shown in FIG. 2 as starting when one or more blocks 104 are placed on the transceiver module 102 (method block 204). A user may place all the blocks 104 (e.g. blocks A-E in the example of FIG. 1) on the transceiver module 102 together or may place blocks 104 one after the other (e.g. block A, followed by block B, followed by block C, etc.) and in either scenario, the method of FIG. 2 proceeds in the same way.

If the sensing and switching arrangement 120 comprises only passive components, the orientation of each placed block 104 may already have been detected and the processor 116 in the placed block 104 connected to one of the antennas/electrodes 114 in the block 104 (method block 206), i.e. this process may occur continuously, irrespective of whether a block 104 is placed on the transceiver module 102, another block 104 or elsewhere (i.e. method block 206 may occur independently of method block 204). If, however, the sensing and switching arrangement 120 comprises at least one active component (e.g. which may be involved in detecting the orientation of the block 104 and/or connecting the processor 116 to an antenna/electrode 114), then the processor 116 in the placed block 104 is not connected to one of the antennas/electrodes 114 in the block 104 until after it has been placed on the transceiver module 102 and so is receiving power from the transceiver module 102 (i.e. method block 206 follows method block 204). Depending upon the role of the active component(s) in the sensing and switching arrangement 120, the detection of orientation may occur independently of the placing on the transceiver module 102 (e.g. where the detection of orientation relies only upon passive components) or may only occur following placement onto the transceiver module 120 (e.g. where the detection of orientation relies upon at least one active component).

As described above, once a block 104 has been placed on the transceiver module 102, the antenna/electrode 114 to which the processor 116 is connected (in method block 206, by the sensing and switching arrangement 120) is referred to as the input antenna/electrode. The input antenna/electrode provides power to the processor 116 and consequently, the processor 116 is able to provide its ID to the transceiver module 102 in response to a request from the transceiver module 102 (method block 208). This process of transferring of the block ID from the block 104 to the transceiver module 102 (in method blocks 208 and 212) may also be referred to as the transceiver module 102 reading the ID of the block 104.

The transceiver module 102 detects the presence of a block 104 (method block 210, e.g. by powering up, trying to communicate and checking if it sees a response or by detecting whether something is coupled to it, for example by measuring the impedance of its load by powering up, trying to communicate and checking if it sees a response) and reads (or requests and then receives) the ID of the adjacent block 104 (method block 212, e.g. block A in the arrangement shown in FIG. 1). The received ID may be stored in memory by the transceiver module 102. If there is a second block 104 (e.g. block B) on top of this first block 104 (e.g. block A) that is adjacent to the transceiver module 102, the transceiver module 102 will not be able to read the ID of that second block 104 (e.g. block B) at this time because the processor in the second block 104 is not powered. The processor in the second block 104 (e.g. block B) is not powered because it has no internal power source, because it is unable to harvest power directly from the transceiver module 102 and because the RF switch 118 in the first block 104 (e.g. block A) is currently set so that it does not couple two antennas/electrodes together.

The second block 104 (e.g. block B) cannot harvest power directly from the transceiver module 102 because the closest antenna/electrode 114 in the second block 104 (e.g. block B) is out of range of the antenna/electrode 106 in the transceiver module 102. The antennas/electrodes may be out of range because the separation between the antenna/electrode 106 in the transceiver module 102 and the closest antenna/electrode 114 in the second block 104 is too large (and this may, therefore, set a minimum dimension for the blocks) and/or because there is an element (e.g. a plate) within the intervening block 104 (e.g. block A) which disrupts or breaks the field.

Having received an ID from the adjacent block (e.g. block A, in method block 212), the transceiver module 102 sends a signal to the processor 116 in the adjacent block 104 instructing it to couple two antennas/electrodes together (method block 214) e.g. to close the RF switch 118. On receipt of the close signal (method block 216), the processor 116 in the block 104 generates a control signal and sends this to the RF switch 118 (method block 218). In examples where the block 104 only has two antennas/electrodes 114 (as shown in FIG. 2), this control signal only needs to cause the RF switch 118 to close, thereby coupling the two antennas/electrodes 114. In other examples, however, where the block 104 has more than two antennas/electrodes 114 (e.g. as shown in FIG. 3), the processor 116 may determine which antenna(s)/electrode(s) 114 to connect to the input antenna/electrode (to which the processor 116 is already connected) and in various examples the processor may connect the input antenna/electrode to each of the other antennas/electrodes in turn (e.g. in separate iterations of the method of FIG. 2).

Once the RF switch 118 is closed and the input antenna/electrode 114 and a second antenna/electrode 114 in the block 104 are coupled together, a second block 104 (e.g. block B) which has a face 112 (and hence antenna/electrode 114) adjacent to the second antenna/electrode 114 in the first block 104 (e.g. block A) can harvest power from the transceiver module 102 via the first block 104 and the method of FIG. 2 repeats such that the transceiver module 102 can read the ID of the second block (in method block 212). If the processor 116 of the first block is still active, the transceiver module 102 may, in this second iteration, read the IDs of both the first and second blocks (in method block 212). Alternatively, however, once the RF switch 118 in a block has been set (in method block 218), the processor 116 may enter a low power state or power down (method block 222) such that the transceiver module 102 only reads a single ID in each iteration and this reduces the power consumption of the block (and hence the overall system 100).

The method may then proceed further with successive iterations reading the IDs of blocks 104 further from the transceiver module 102 (e.g. higher up the stack of blocks shown in FIG. 1) such that the transceiver module 102 can read the ID of each block 104 in the assembly created by the user. Referring to the assembly of blocks shown in FIG. 1, a first iteration may read ID A, a second iteration may read ID B, a third iteration may read ID C, a fourth iteration may read ID D and a fifth iteration may read ID E. A further iteration does not read any new IDs and so the transceiver module 102 can determine that all the IDs have been read.

As the IDs are received, or alternatively once the transceiver module 102 has collected all IDs (e.g. as determined by there being no new IDs received in a final iteration of the method), the transceiver module 102 generates topology data (e.g. a topology map) for the assembled blocks (method block 220). The topology data may be fed into an application running on the transceiver module 102 or another computing device and used to generate a virtual representation of the arrangement of blocks created by the user. Alternatively the topology data may be used for another purpose. In an example where each block 104 represents a function, the topology data may be used to control an external system or process according to the sequence of functions represented by the arrangement of blocks. In another example, the methods described herein may be used to detect the configuration of components inside a server computer or machine (e.g. where the component parts have been augmented with antennas/electrodes and RF switches as described above). In a further example, the methods described herein may be used in other industrial applications, such as automatically detecting the contents of a warehouse.

FIGS. 4-6 and 8-11 show various example implementations of the blocks 104 shown in FIGS. 1 and 3 and in particular different implementations of the sensing and switching arrangement 120. It will be appreciated that aspects of any of these examples may be combined to generate yet further example implementations. In particular, while some examples only show two antennas/electrodes per block, many examples may be extended to comprise more than two examples per block (e.g. with a corresponding change to the RF switch such that it is a multi-way switch).

Figure 4:
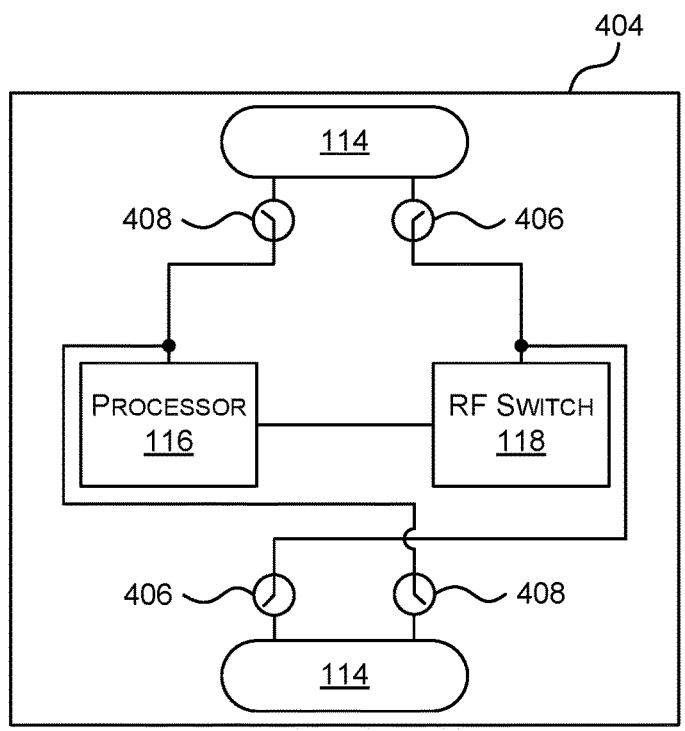
FIG. 4 shows a schematic diagram of an example block comprising gravity-activated switches.

FIG. 4 shows an example block 404 in which the sensing and switching arrangement 120 comprises four tilt (or gravity-activated) switches 406, 408 (e.g. mercury tilt switches) which open and close when tilted at certain angles. In the arrangement shown in FIG. 4, there are two tilt switches 406 which are closed when up, so that in the orientation shown in FIG. 4, the upper switch 406 is closed, thereby connecting the upper antenna/electrode 114 to the RF switch 118 and the lower switch 406 is open so that the lower antenna/electrode 114 is not connected to the RF switch 118. The other pair of tilt switches 408 are closed when down, so that in the orientation shown in FIG. 4, the lower switch 408 is closed, thereby connecting the lower antenna/electrode 114 to the processor 116 (e.g. to an RF common input of the processor 116) and the upper switch 408 is open so that the upper antenna/electrode 114 is not connected to the processor 116. In this arrangement, if the block 404 is placed on a transceiver module 102 (or another block 404 which is on the transceiver module 102), the lower antenna/electrode 114 is connected to the processor 116 and is the input antenna/electrode and the upper antenna/electrode 114 is only coupled to the lower antenna/electrode 114 when the RF switch 118 is closed.

The block 404 shown in FIG. 4 is suitable for blocks having only two antennas/electrodes on opposite faces and for vertical stacks of blocks such as the arrangement shown in FIG. 1. The sensing and switching arrangement 120 shown in FIG. 4 (i.e. the combination of the 4 tilt switches and their connections to the processor 116 and RF switch 118) operates irrespective of whether power is provided (via the input antenna/electrode) and so, referring back to FIG. 2, method block 206 may be performed before method block 204.

Figure 5:
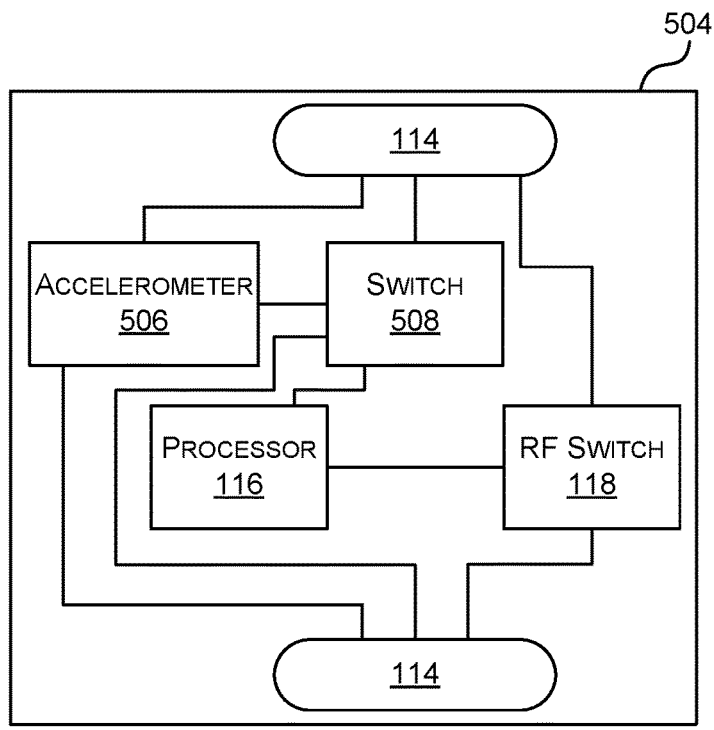
FIG. 5 shows a schematic diagram of an example block comprising an accelerometer.

FIG. 5 shows an example block 504 which operates in a similar manner to the block 404 shown in FIG. 4, but in which the sensing and switching arrangement 120 comprises an accelerometer 506 and switch 508 instead of the tilt switches 406, 408. The accelerometer 506 may be a single-axis accelerometer or other accelerometer with a low power consumption and hence which can be powered by harvesting power from one of the antennas/electrodes 114 (e.g. from the input antenna/electrode when placed on a transceiver module 102). Depending upon the orientation of the block 504, as detected by the accelerometer 506, the switch 508 connects the lower antenna/electrode 114 to the processor 116. As in FIG. 4, the upper antenna/electrode 114 is only coupled to the lower antenna/electrode 114 when the RF switch 118 is closed.

If the accelerometer 506 is a single-axis accelerometer, block 504 is suitable for blocks having only two antennas/electrodes on opposite faces and for vertical stacks of blocks such as the arrangement shown in FIG. 1. If, however, the accelerometer 506 is a multi-axis accelerometer (e.g. a three-axis accelerometer) or multiple single-axis accelerometers are used, the block 504 may be suitable for blocks having more than two antennas/electrodes. Like block 404, block 504 is only suitable for vertical stacks of blocks such as the arrangement shown in FIG. 1.

The sensing and switching arrangement 120 shown in FIG. 5 (i.e. the combination of the accelerometer 506, switch 508 and their connections to the processor 116 and RF switch 118) requires harvested power to operate and so, referring back to FIG. 2, method block 206 cannot be performed before method block 204.

Figure 6:
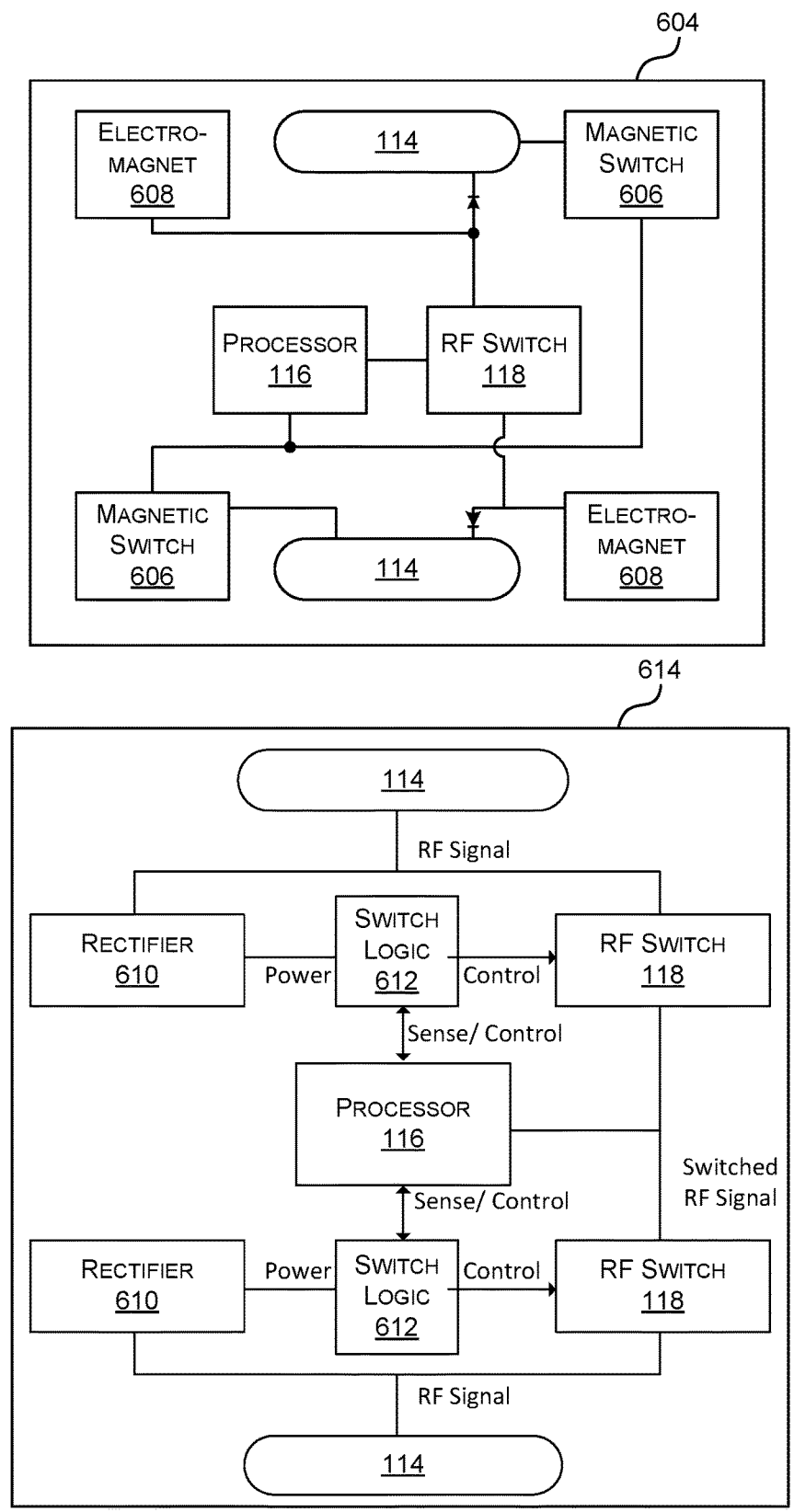
FIG. 6 shows schematic diagrams of two example blocks, one using a magnetic field to detect orientation and the other using the RF field to detect orientation.

FIG. 6 shows an example block 604 which operates in a similar manner to blocks 404 and 504 shown in FIGS. 4 and 5, but in which the sensing and switching arrangement 120 comprises a pair of magnetic switches 606 (which are normally open) and a pair of electromagnets 608 and so this configuration is not limited to vertical stacks of blocks. If the block 604 is placed on the transceiver module 102, a magnet in the transceiver module 102 causes the lower magnetic switch 606 to close and this connects the lower antenna/electrode 114 to the processor 116. As in FIGS. 4 and 5, the upper antenna/electrode 114 is only coupled to the lower antenna/electrode 114 when the RF switch 118 is closed. When the RF switch 118 is closed, as well as coupling the lower and upper antennas/electrodes 114, the upper electromagnet 608 is powered and so, if a second block 604 is placed on top of the first block 604, the upper electromagnet 608 in the first block 604 causes the lower magnetic switch 606 in the second block 604 to close and this connects the lower antenna/electrode 114 in the second block 604 to the processor 116 in the second block 604.

Figure 7:
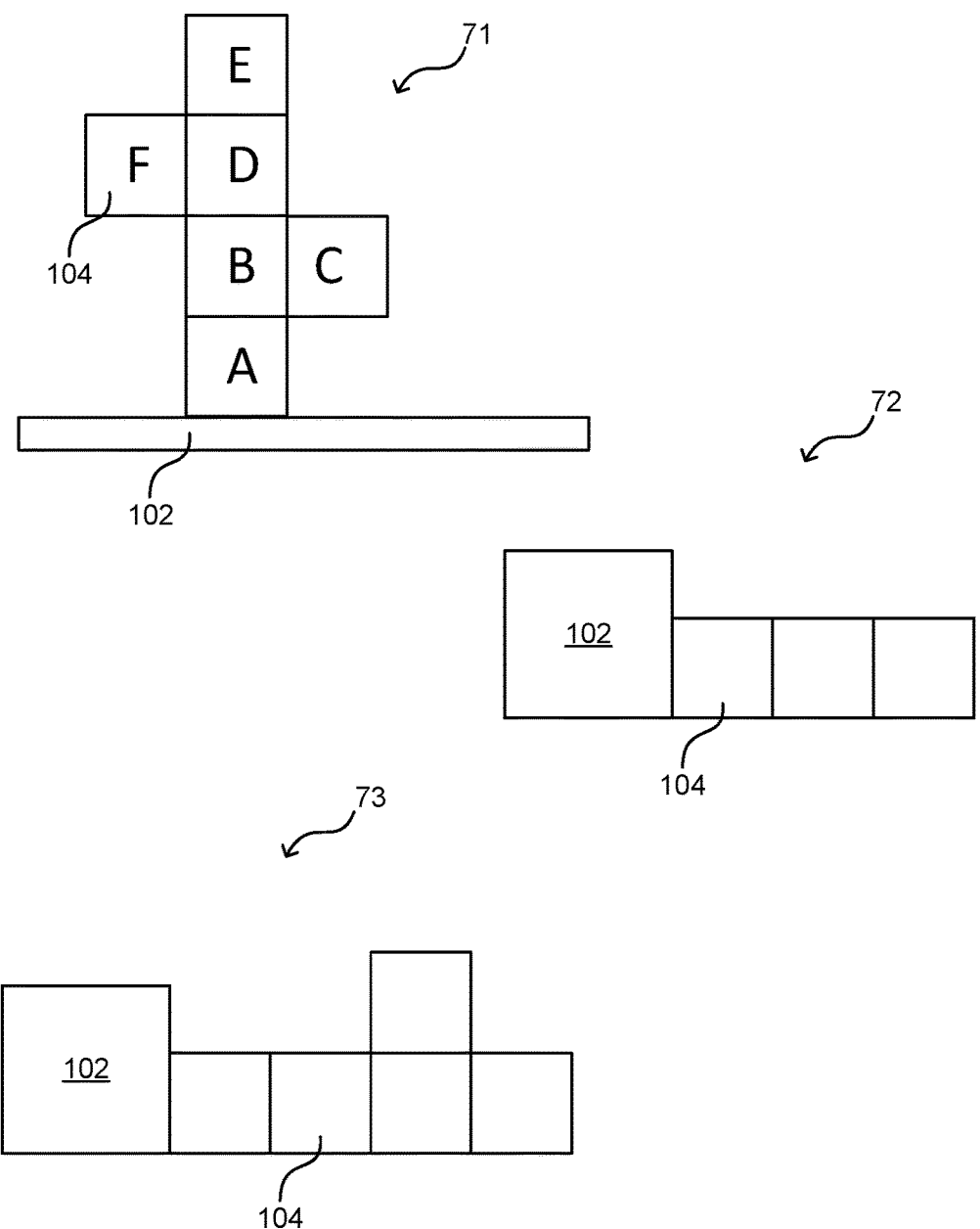
FIG. 7 shows schematic diagrams of various example arrangements of blocks.

Although the block 604 shown in FIG. 6 only has two antennas/electrodes on opposite faces, this particular sensing and switching arrangement 120 is not limited to this configuration and it may be used where there are antennas/electrodes adjacent to more than two faces and for other arrangements of blocks as well as vertical stacks of blocks, such as the arrangements 71-73 shown in FIG. 7. In various examples, the electromagnets 608 act to hold the blocks 604 together (e.g. in arrangement 71) as well as being used as part of the sensing and switching arrangement 120.

In examples where there are antennas/electrodes adjacent to more than two faces, the RF switch 118 is a multi-way switch such that it can couple any two of the four antennas/electrodes 114 together; however, as noted above, in order that power can be transferred through the block 604 from the transceiver module 102 to an adjacent block, one of the two antennas/electrodes which are coupled together is always the input antenna/electrode. In this example, the input antenna/electrode may be determined by the processor 116 by reading the state of the magnetic switches 606 or by having duplicate magnetic switches 606 which each connect to a separate input to the processor (e.g. so that the processor can determine via which antenna/electrode power is being received). In examples where the blocks 604 are only stacked vertically (as shown in FIG. 1) or horizontally (as shown in arrangement 72), the multi-way RF switch may be always used to couple the input antenna/electrode 114 to an antenna/electrode on an opposing face. In examples, however, where blocks 604 may be arranged in a branching, rather than purely linear, structure (e.g. as shown in arrangements 71 and 73), the multi-way RF switch may be used to couple the input antenna/electrode 114 to each of the other antennas/electrodes in turn so that, in multiple iterations of the method of FIG. 2 (e.g. multiple iterations of method blocks 206-218) the transceiver module 102 can read the IDs of any blocks adjacent to any of the faces of block 604 and of any other blocks which are adjacent to those adjacent blocks, etc.

For example, referring to the arrangement 71 of blocks shown in FIG. 7, in a first iteration ID A may be read, in a second iteration and ID B may be read by the transceiver module. In the next iteration either ID C or D may be read (depending upon the order in which antennas/electrodes are connected to the input antenna/electrode) and in the next iteration the other of IDs C and D may be read. Similarly in the next iteration either ID E or F may be read and in the next iteration the other of IDs E and F may be read. There may also be iterations within the sequence in which no IDs are read, for example where the input antenna/electrode is connected to an output antenna/electrode on a face which has no adjacent block. In such iterations, as no new ID is read (in method block 212), the close signal sent by the transceiver module may instruct the processor to connect a different antenna/electrode within the same block to the input antenna/electrode.

FIG. 6 also shows another example block 614 which uses the RF field to achieve the same effect and has a lower power consumption because it does not use power-hungry electromagnets. In block 614, all switches are normally open and so nothing is connected. If the block 614 is placed on the transceiver module 102, the bottom antenna/electrode 114 gets powered from an adjacent antenna/electrode within the transceiver module 102. Consequently, the bottom rectifier 610 becomes powered and outputs power to the bottom switch logic 612. The bottom switch logic 612 detects that the processor 116 is off and so enables the bottom RF switch 118, which powers the processor 116. When powered up, the processor 116 reads all its sense lines to determine which face is powered. The processor 116 then forces the other RF Switches 118 on/off, in sequence, to scan for other adjacent blocks.

The sensing and switching arrangements 120 shown in FIG. 6 (i.e. the combination of the electromagnets 608 and magnetic switches 606 and their connections to the processor 116 and RF switch 118 in block 604 and the combination of the rectifiers 610 and switch logic 612 and their connections to the processor 116 and RF switches 118 in block 614) requires harvested power to operate and so, referring back to FIG. 2, method block 206 cannot be performed before method block 204.

Figure 8:
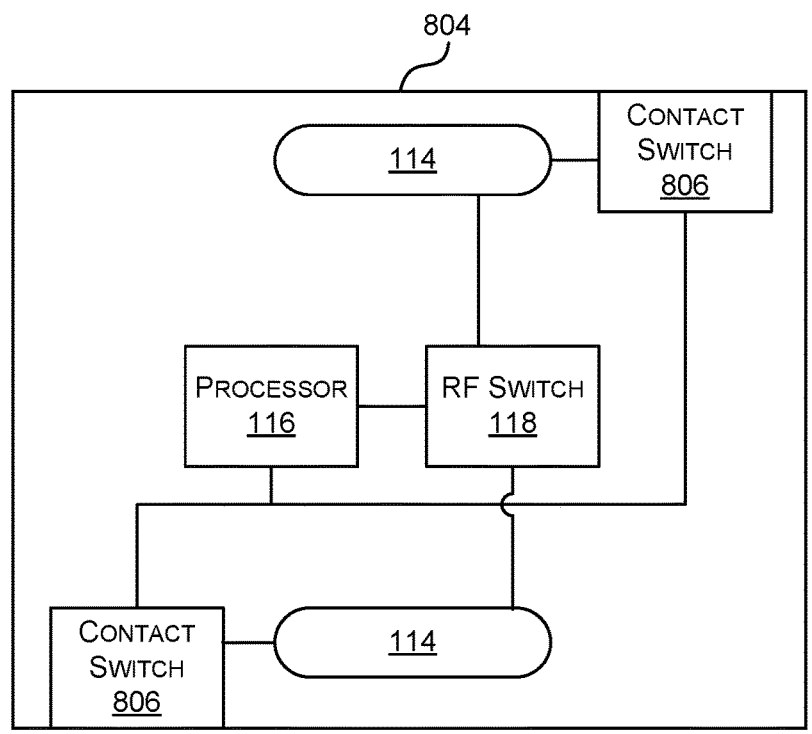
FIG. 8 shows a schematic diagram of an example block comprising mechanical switches.

FIG. 8 shows an example block 804 which operates in a similar manner to the block 404 shown in FIG. 4, but in which the sensing and switching arrangement 120 comprises two mechanical switches 806 instead of the tilt switches 406, 408. The mechanical switches 806 are referred to as 'contact switches' in FIG. 8 because whilst they are normally open, if they are in contact with another block (or other object) they close. Consequently, if the block 804 is placed on the transceiver module 102, the lower contact switch closes and connects the lower antenna/electrode 114 to the processor 116. As in FIG. 4, the upper antenna/electrode 114 is only coupled to the lower antenna/electrode 114 when the RF switch 118 is closed.

The block 804 is suitable for blocks having only two antennas/electrodes on opposite faces and for vertical stacks of blocks such as the arrangement shown in FIG. 1. If, however, the block 804 also comprises means for attaching one block to an adjacent block, the block 804 may also be used where there are antennas/electrodes adjacent to more than two faces and for other arrangements of blocks as well as vertical stacks of blocks, such as the arrangements 71-73 shown in FIG. 7.

The sensing and switching arrangement 120 shown in FIG. 8 (i.e. the contact switches 806 and their connections to the processor 116 and RF switch 118) operates irrespective of whether power is provided (via the input antenna/electrode) and so, referring back to FIG. 2, method block 206 may be performed before method block 204.

Figure 9:
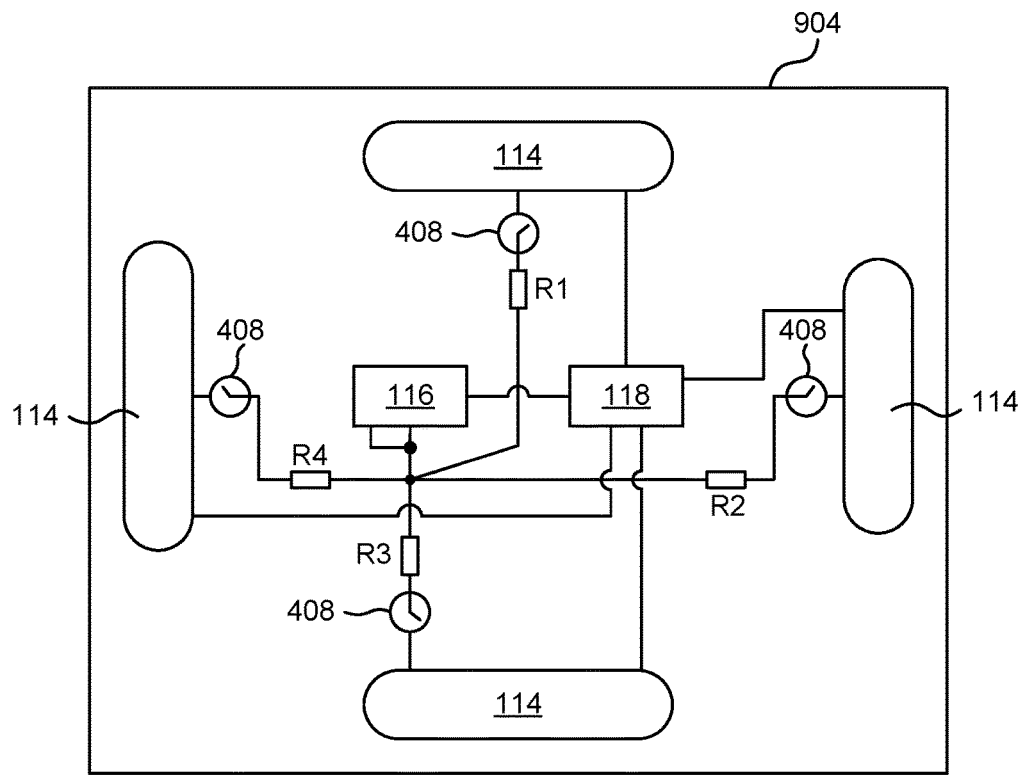
FIG. 9 shows a schematic diagram of another example block comprising gravity-activated switches.

As noted above, block 404 (as shown in FIG. 4) is suitable for blocks having only two antennas/electrodes on opposite faces. FIG. 9 shows a variation on block 404 which is suitable for blocks having more than two antennas/electrodes and in the example shown, block 904 has four antennas/electrodes 114. In this example, the sensing and switching arrangement 120 comprises four tilt (or gravity-activated) switches 408 which are closed when down, so that in the orientation shown in FIG. 9, only the bottom switch 408 is closed, thereby connecting the bottom antenna/electrode 114 to the processor 116 (e.g. to an RF common input of the processor 116).

In this example, the RF switch 118 is a multi-way switch such that it can couple any two of the four antennas/electrodes 114 together; however, as noted above, in order that power can be transferred through the block 904 from the transceiver module 102 to an adjacent block, one of the two antennas/electrodes which are coupled together is always the input antenna/electrode. In this example, the input antenna/electrode is determined by the processor 116 by measuring the resistance of the connection between the processor 116 and one of the antennas/electrodes 114 via the one closed tilt switch 408. As shown in FIG. 9, the path between each antenna/electrode 114 and the processor 116 comprises a resistor R1-R4 and the resistances are different in each path (i.e. R1≠R2≠R3≠R4). In order that the resistance can be determined by the processor 116, the antenna/electrode 114 may be connected (via the tilt switch 408) to both an RF common input and an analog input of the processor. Once the antenna/electrode has determined which antenna/electrode is the input antenna/electrode, it can then send a control signal to the multi-way RF switch 118 to couple the input antenna/electrode to the antenna/electrode on the opposing face to the input antenna/electrode.

The block 904 shown in FIG. 9 is suitable for vertical stacks of blocks such as the arrangement shown in FIG. 1 but unlike block 404, block 904 can be placed in any orientation on the transceiver module 102 or a lower block in the stack. The sensing and switching arrangement 120 shown in FIG. 9 (i.e. the combination of the 4 tilt switches and 4 resistors and their connections to the processor 116 and RF switch 118) operates irrespective of whether power is provided (via the input antenna/electrode) and so, referring back to FIG. 2, method block 206 may be performed before method block 204.

Instead of using the resistors R1-R4 in block 904, another mechanism may be used to enable the processor to determine which antenna/electrode is the input antenna/electrode. For example, there may be duplicate tilt switches which each connect to a separate input to the processor (e.g. so that the processor can determine via which antenna/electrode power is being received) or another mechanism which enables the processor to determine (or 'read') the status of each of the tilt switches 408.

Figure 10:
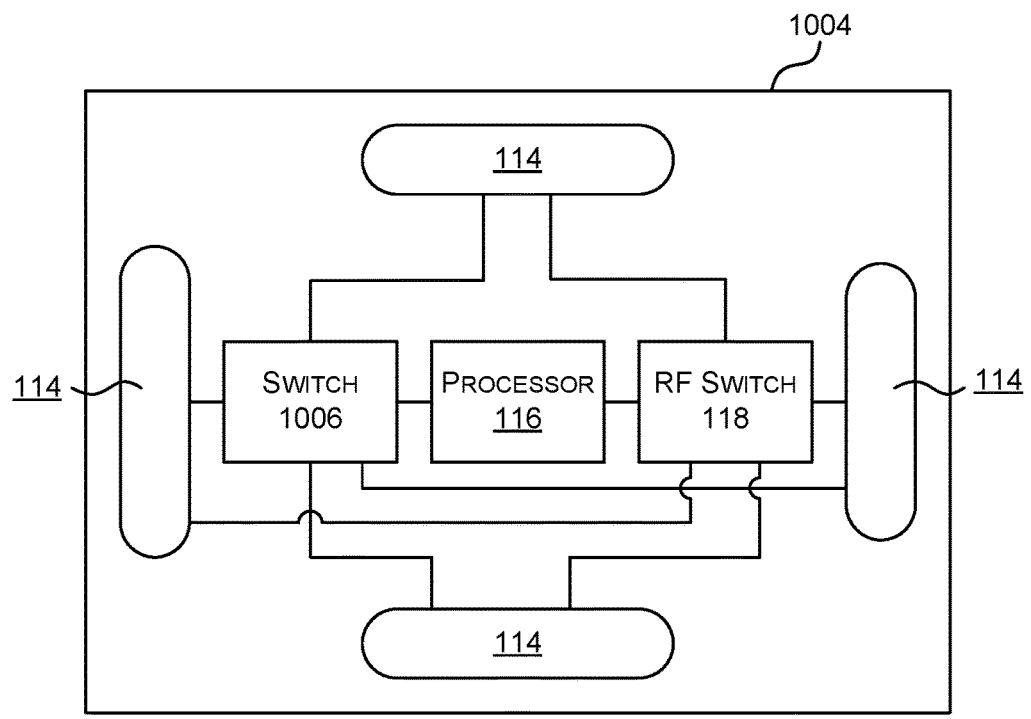
FIG. 10 shows a schematic diagram of an example block comprising two multi-way switches.
Figure 11:
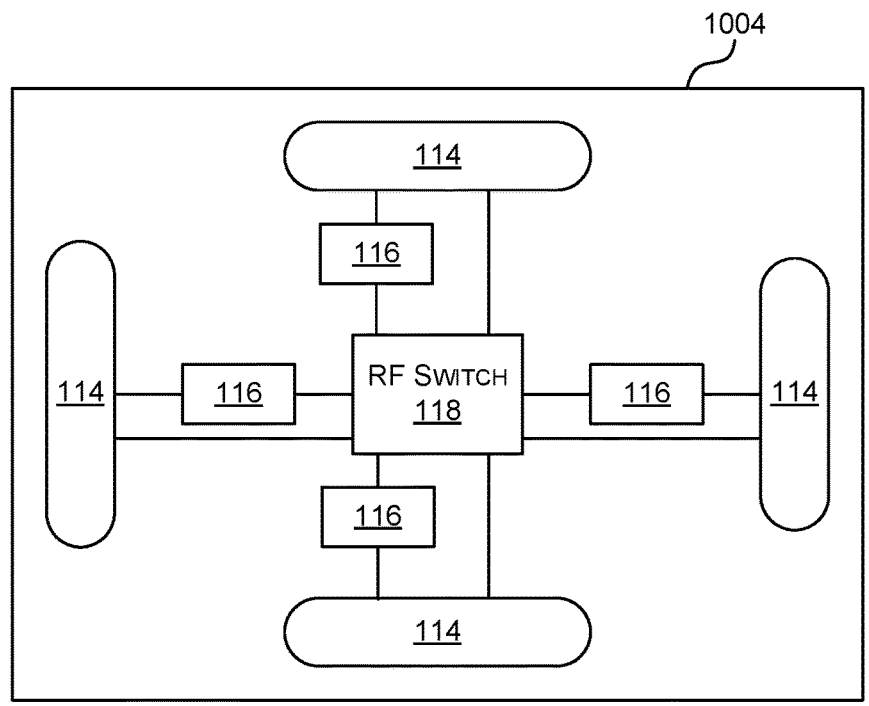
FIG. 11 shows a schematic diagram of an example block comprising a separate processor connected to each of the plurality of antennas/electrodes.

FIG. 10 shows an example block 1004 in which the sensing and switching arrangement 120 comprises a multi-way switch 1006 which, in its default state connects all four antennas/electrodes 114 to the processor 116. Consequently, the processor 116 receives power irrespective of which face is adjacent to the transceiver module 102. In this example (like FIG. 9), the RF switch 118 is a multi-way switch such that it can couple any two of the four antennas/electrodes 114 together; however, as noted above, in order that power can be transferred through the block 1004 from the transceiver module 102 to an adjacent block, one of the two antennas/electrodes which are coupled together is always the input antenna/electrode. In this example, the input antenna/electrode is determined by the processor 116 by storing the state of the multi-way switch 1006, selectively disconnecting one of the antennas/electrodes 114 and then repeating this for each antenna/electrode 114 in turn. When the processor 116 disconnects the input antenna/electrode, it will lose power and then when it returns to its default state (with all four antennas/electrodes connected), it can determine from the state stored immediately prior to the loss of power, which antenna/electrode is the input antenna/electrode.

Once the antenna/electrode has determined which antenna/electrode is the input antenna/electrode, it can then send a control signal to the multi-way RF switch 118 to couple the input antenna/electrode to one of the other antennas/electrodes. In examples where the blocks 1004 are only stacked vertically (as shown in FIG. 1) or horizontally (as shown in arrangement 72), the multi-way RF switch may be always used to couple the input antenna/electrode 114 to an antenna/electrode on an opposing face. In examples, however, where blocks 1004 may be arranged in a branching, rather than purely linear, structure (e.g. as shown in arrangements 71 and 73), the multi-way RF switch may be used to couple the input antenna/electrode 114 to each of the other antennas/electrodes in turn so that, in multiple iterations of the method of FIG. 2 (e.g. multiple iterations of method blocks 206-218) the transceiver module 102 can read the IDs of any blocks adjacent to any of the faces of block 1004 and of any other blocks which are adjacent to those adjacent blocks, etc. It will be appreciated that for arrangement 71 shown in FIG. 7 to be possible, the blocks 1004 must additionally comprise an interconnection mechanism (e.g. in the form of surface features or magnets).

In the examples described above and shown in FIGS. 1, 3-6 and 8-10, each block comprises a single processor 116 having a single ID. In further examples, however, a block may comprise a plurality of processors 116, each having the same ID or a different ID, and each being connected to a different one of the plurality of antennas/electrodes 114. In this example, the sensing and switching arrangement 120 includes the plurality of processors 116 as collectively they determine which of the processors 116 controls the RF switch 118.

If block 1104 is placed on the transceiver module 102, the processor 116 which is connected to the antenna/electrode 114 adjacent to the transceiver module 102 is powered up as a consequence of power harvesting from the transceiver module 102. The other processors 116 are not powered up. The ID of the powered up processor 116 can then be read by the transceiver module (method blocks 208, 212). The powered up processor 116 can also generate and send control signals to the multi-way RF switch 118 in response to signals received from the transceiver module 102 and as described above, the multi-way RF switch may be used to couple the input antenna/electrode 114 to one of the other antennas/electrodes (e.g. the antenna/electrode on the opposing face to the input antenna/electrode) or to each of the other antennas/electrodes in turn so that, in multiple iterations of the method of FIG. 2 (e.g. multiple iterations of method blocks 206-218) the transceiver module 102 can read the IDs of any blocks adjacent to any of the faces of block 1104 and of any other blocks which are adjacent to those adjacent blocks, etc.

Depending upon whether each of the processors 116 in the block 1104 has the same ID or a different ID, the transceiver module 102 may read different IDs depending upon the orientation of the block 1104 on the transceiver module. Furthermore, when two antennas/electrodes 114 are coupled together by the multi-way RF switch, a second processor may be powered up within the block 1104 and this may result in the transceiver module 102 reading two different IDs from the same block. These different IDs may assist the transceiver module 102 (or the software application) in determining the topology of the assembled blocks (in method block 220).

Although the description above refers to blocks being placed on a transceiver module 102, it will be appreciated that in examples where blocks can be arranged in configurations other than a vertical stack, the blocks may alternatively be placed adjacent to the transceiver module 102 (e.g. as shown in arrangements 72 and 73 in FIG. 7).

In addition to sending signals to control the RF switch, the transceiver module 102 may also send signals to the processor in a block to control a further RF switch (not shown in the FIGs.) which can be used to dynamically switch in capacitors/inductors to adjust the tuning between pairs of antennas/electrodes (in adjacent blocks) and optimize the coupling. Switching in of capacitors/inductors in this way may enable centralized detection of larger collections of blocks and/or improve the reliability (e.g. where there is poor coupling between the transceiver module and the first block or between blocks close to the transceiver module).

In addition to receiving IDs from blocks (in method block 212), the transceiver module 102 may also receive additional information and/or communicate with a block to obtain information stored in the non-volatile memory of a processor in a block (e.g. to identify visual characteristics of a block such as its color) or to obtain sensor data (e.g. where a block comprises one or more sensors which are only active when the processor is being powered from the transceiver module).

Although in the examples above the blocks are described as being adjacent to each other or on top of each other, they do not need to be physically touching each other (i.e. actually in contact with each other) because of the use of non-contact coupling.

In the examples described above the same mechanism is used to transfer both power and data (i.e. the IDs of the blocks). In other examples, the mechanism described above may be used to provide power and to reset the state of the blocks and once powered, a different communication channel may be used to provide the block ID to the transceiver (in block 208), e.g. by broadcasting on a Bluetooth™ channel.

In the examples described above, the coupling elements 114 may be electrodes where capacitive coupling is used or antennas where inductive coupling or short-range wireless is used. In examples where short-range wireless is used, the radiation pattern generated by the antenna may be controlled in order to be able to determine adjacency or alternatively, signal strength may be used to determine adjacency. The radiation pattern may, for example, be controlled by the shape of the antenna or through the use of shielding, so that it can only communicate with other devices within a predefined range (e.g. within 2 cm, 45° cone from the antenna).

The processors 116 shown in FIGS. 1, 3-6 and 8-11 may be microprocessors, controllers or any other suitable type of processors for processing computer executable instructions to control the operation of the device in order to control an RF switch and store an identifier (e.g. an NFC IC). The processor 110 in the transceiver module 102 may be a microprocessor, controller or any other suitable type of processor for processing computer executable instructions to control the operation of the device in order to detect IDs and send signals to the blocks to control the RF switches in order to perform centralized topology detection for the user assembled collection of blocks. In some examples, for example where a system on a chip architecture is used, the processors 110, 116 may include one or more fixed function blocks (also referred to as accelerators) which implement a part of the method of controlling an RF switch and/or topology detection in hardware (rather than software or firmware). Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The computer executable instructions executed by the processors 110, 116 are provided using any computer-readable media that is accessible by the processors. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se.

Although not shown in FIG. 1, the transceiver module 102, or a computing device to which the transceiver module 102 is connected, may also comprise an input/output controller arranged to output display information (e.g. the virtual version of the construction) to a display device which may be separate from or integral to the transceiver module 102 or a computing device to which the transceiver module 102 is connected. The display information may provide a graphical user interface. The input/output controller may be arranged to receive and process input from one or more devices, such as a user input device (e.g. a mouse, keyboard, camera, microphone or other sensor). In some examples the user input device detects voice input, user gestures or other user actions and provides a natural user interface (NUI). This user input may be used to interact with the virtual version of the construction. In an embodiment the display device also acts as the user input device if it is a touch sensitive display device.

Any of the input/output controller, display device and the user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (RGB) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Although the present examples are described and illustrated herein as being implemented in a system comprising identical square blocks, the system described is provided as an example and not a limitation. As those skilled in the art will appreciate, the present examples are suitable for application in a variety of different types of modular construction systems and the blocks may have different shapes. A modular construction system may also comprise additional blocks (e.g. additional types of blocks, such as power blocks) as well as a plurality of the blocks as described herein. Furthermore although many of the examples are described with reference to a block comprising only two antennas/electrodes, the blocks may alternatively comprise more than two antennas/electrodes.

A first further example provides a system comprising a plurality of building blocks, each building block comprising: a plurality of faces; a plurality of coupling elements, wherein a first coupling element is adjacent to a first face and a second coupling element is adjacent to a second face and wherein the plurality of coupling elements comprises a plurality of antennas or a plurality of electrodes; an RF switch configured to selectively couple two of the plurality of coupling elements together; a processor having an identifier and arranged to control the RF switch in response to signals received from a transceiver module; and a sensing and switching arrangement configured to selectively connect the processor to the first or second coupling element based on a detected orientation of the block.

A second further example provides a system comprising a plurality of building blocks, each building block comprising: a plurality of faces; a plurality of coupling elements, wherein a first coupling element is adjacent to a first face and a second coupling element is adjacent to a second face and wherein the plurality of coupling elements comprises a plurality of antennas or a plurality of electrodes; means for selectively coupling two of the plurality of coupling elements together; a processor having an identifier and arranged to control the means for selectively coupling in response to signals received from a transceiver module; means for detecting an orientation of the block and means for selectively connecting the processor to the first or second coupling element based on a detected orientation of the block.

In the first or second further example, the orientation may be detected relative to gravity, the transceiver module or an adjacent building block.

In the first or second further example, each building block may not comprise an internal power source and wherein the processor is configured to receive power from the transceiver module via a coupling element.

In the first or second further example, the processor may be a NFC IC.

In the first or second further example, the signals may be received by the processor from the transceiver module via one of the plurality of coupling elements.

In the first or second further example, the processor may be further arranged to enter a low power mode after controlling the RF switch to cause the selective coupling of two coupling elements together.

In the first or second further example, the first and second faces may be top and bottom faces of the block and the sensing and switching arrangement may comprise a plurality of gravity-activated switches arranged to connect the processor to the coupling element adjacent to the bottom face of the block. Optionally, the sensing and switching arrangement may further comprise a plurality of resistive elements of different resistances, wherein a resistive element is connected in series with each gravity-activated switch and wherein the processor is arranged to control the RF switch in response to signals received from a transceiver module and based on a measured resistance between the processor and the coupling element adjacent to the bottom face of the block.

In the first or second further example, the sensing and switching arrangement may comprise an accelerometer and a switch arranged to connect the processor to the coupling element adjacent to a bottom face of the block based on an output of the accelerometer.

In the first or second further example, the sensing and switching arrangement may comprise a plurality of electromagnets connected to the RF switch and a plurality of magnetic switches, wherein a first electromagnet and a first magnetic switch are adjacent to the first face and a second electromagnet and a second magnetic switch are adjacent to the second face, wherein the first magnetic switch is arranged to connect the processor to the first coupling element in response to a magnetic field and the second magnetic switch is arranged to connect the processor to the second coupling element in response to a magnetic field and wherein the RF switch is further configured to selectively activate one of the electromagnets when coupling two of the plurality of coupling elements together.

In the first or second further example, the sensing and switching arrangement may comprise a plurality of contact switches, wherein a first contact switch is on the first face and a second contact switch is on the second face, wherein the first contact switch is arranged to selectively connect the processor to the first coupling element and the second contact switch is arranged to selectively connect the processor to the second coupling element.

In the first or second further example, the orientation may be detected relative to an external source of power.

In the first or second further example, the sensing and switching arrangement may comprise a switch arranged, in an initial state, to connect the processor to all of the coupling elements and then, in a detection phase, to sequentially disconnect each of the coupling elements and in response to a loss of power, to return to the initial state.

The first or second further example may further comprise the transceiver module and wherein the transceiver module comprises: a coupling element; a transceiver; and a processor arranged to determine a topology of an assembly of building blocks by selectively controlling RF switches in each of the building blocks to activate each building block in turn and by reading the identifier of each of the building blocks.

The first or second further example may further comprise the transceiver module and wherein the transceiver module comprises: a coupling element; an interface to a computing device; and a transceiver arranged to selectively control RF switches in each of the building blocks to activate each building block in turn and to read the identifier of each of the building blocks in response to control signals received from the computing device.

A third further example provides a system comprising a plurality of building blocks, each building block comprising: a plurality of faces; a plurality of coupling elements, wherein a first coupling element is adjacent to a first face and a second coupling element is adjacent to a second face and wherein the plurality of coupling elements comprises a plurality of antennas or a plurality of electrodes; an RF switch configured to selectively couple two of the plurality of coupling elements together; and a plurality of processors each having an identifier and arranged to control the RF switch in response to signals received from a transceiver module, wherein a first processor is connected to the first coupling element and a second processor is connected to the second coupling element.

In the third further example, each building block may not comprise an internal power source and wherein a processor is configured to receive power from the transceiver module via a connected coupling element.

A fourth further example provides a method of detecting a topology of an assembly of building blocks comprising, at a building block in the assembly: detecting an orientation of the block and based on the detected orientation, connecting a processor in the block to one of a plurality of coupling elements in the block, each coupling element being positioned adjacent to a different face of the block and the plurality of coupling elements comprising a plurality of antennas or a plurality of electrodes; transmitting, in response to a request received from a transceiver module, an identifier for the block from the processor to the transceiver module via the coupling element connected to the processor; and in response to receiving a control signal from the transceiver module, sending a control signal from the processor to an RF switch in the block, the control signal being arranged to cause the RF switch to selectively couple the coupling element connected to the processor to another one of the plurality of coupling elements in the block.

The fourth further example may further comprise, at the building block: putting the processor into a low power state after sending the control signal from the processor to the RF switch.

The fourth further example may further comprise, at the transceiver module: receiving an identifier for a first block; sending a control signal to the block to cause the RF switch in the first block to selectively couple the coupling element connected to the processor in the first block to another one of the plurality of coupling elements in the first block; and repeating the receiving and sending for any blocks adjacent to the first block, wherein the identifiers are received via the first block and the control signals are sent via the first block.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. Examples of tangible storage media include computer storage devices comprising computer-readable media such as disks, thumb drives, memory etc. and do not include propagated signals. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A system comprising a plurality of building blocks, each building block comprising:
   a plurality of faces;
   a plurality of coupling elements, wherein a first coupling element is adjacent to a first face and a second coupling element is adjacent to a second face and wherein the plurality of coupling elements comprises a plurality of antennas or a plurality of electrodes;
   an RF switch configured to selectively couple two of the plurality of coupling elements together;
   a processor having an identifier and arranged to control the RF switch in response to signals received from a transceiver module; and
   a sensing and switching arrangement configured to selectively connect the processor to the first or second coupling element based on a detected orientation of the block.

2. A system according to claim 1, wherein the orientation is detected relative to gravity, the transceiver module or an adjacent building block.

3. A system according to claim 1, wherein each building block does not comprise an internal power source and wherein the processor is configured to receive power from the transceiver module via a coupling element.

4. A system according to claim 1, wherein the processor is a NFC IC.

5. A system according to claim 1, wherein the signals are received by the processor from the transceiver module via one of the plurality of coupling elements.

6. A system according to claim 1, wherein the processor is further arranged to enter a low power mode after controlling the RF switch to cause the selective coupling of two coupling elements together.

7. A system according to claim 1, wherein the first and second faces are top and bottom faces of the block and the sensing and switching arrangement comprises a plurality of gravity-activated switches arranged to connect the processor to the coupling element adjacent to the bottom face of the block.

8. A system according to claim 7, wherein the sensing and switching arrangement further comprises a plurality of resistive elements of different resistances, wherein a resistive element is connected in series with each gravity-activated switch and wherein the processor is arranged to control the RF switch in response to signals received from a transceiver module and based on a measured resistance between the processor and the coupling element adjacent to the bottom face of the block.

9. A system according to claim 1, wherein the sensing and switching arrangement comprises an accelerometer and a switch arranged to connect the processor to the coupling element adjacent to a bottom face of the block based on an output of the accelerometer.

10. A system according to claim 1, wherein the sensing and switching arrangement comprises a plurality of electromagnets connected to the RF switch and a plurality of magnetic switches, wherein a first electromagnet and a first magnetic switch are adjacent to the first face and a second electromagnet and a second magnetic switch are adjacent to the second face, wherein the first magnetic switch is arranged to connect the processor to the first coupling element in response to a magnetic field and the second magnetic switch is arranged to connect the processor to the second coupling element in response to a magnetic field and wherein the RF switch is further configured to selectively activate one of the electromagnets when coupling two of the plurality of coupling elements together.

11. A system according to claim 1, wherein the sensing and switching arrangement comprises a plurality of contact switches, wherein a first contact switch is on the first face and a second contact switch is on the second face, wherein the first contact switch is arranged to selectively connect the processor to the first coupling element and the second contact switch is arranged to selectively connect the processor to the second coupling element.

12. A system according to claim 1, wherein the orientation is detected relative to an external source of power.

13. A system according to claim 12, wherein the sensing and switching arrangement comprises a switch arranged, in an initial state, to connect the processor to all of the coupling elements and then, in a detection phase, to sequentially disconnect each of the coupling elements and in response to a loss of power, to return to the initial state.

14. A system according to claim 1, further comprising the transceiver module and wherein the transceiver module comprises:
   a coupling element;
   a transceiver; and
   a processor arranged to determine a topology of an assembly of building blocks by selectively controlling RF switches in each of the building blocks to activate each building block in turn and by reading the identifier of each of the building blocks.

15. A system according to claim 1, further comprising the transceiver module and wherein the transceiver module comprises:
   a coupling element;
   an interface to a computing device; and
   a transceiver arranged to selectively control RF switches in each of the building blocks to activate each building block in turn and to read the identifier of each of the building blocks in response to control signals received from the computing device.

16. A system comprising a plurality of building blocks, each building block comprising:
   a plurality of faces;
   a plurality of coupling elements, wherein a first coupling element is adjacent to a first face and a second coupling element is adjacent to a second face and wherein the plurality of coupling elements comprises a plurality of antennas or a plurality of electrodes;
   an RF switch configured to selectively couple two of the plurality of coupling elements together; and
   a plurality of processors each having an identifier and arranged to control the RF switch in response to signals received from a transceiver module, wherein a first processor is connected to the first coupling element and a second processor is connected to the second coupling element.

17. A system according to claim 16, wherein each building block does not comprise an internal power source and wherein a processor is configured to receive power from the transceiver module via a connected coupling element.

18. A method of detecting a topology of an assembly of building blocks comprising, at a building block in the assembly:
   detecting an orientation of the block and based on the detected orientation, connecting a processor in the block to one of a plurality of coupling elements in the block, each coupling element being positioned adjacent to a different face of the block and the plurality of coupling elements comprising a plurality of antennas or a plurality of electrodes;
   transmitting, in response to a request received from a transceiver module, an identifier for the block from the processor to the transceiver module via the coupling element connected to the processor;
   in response to receiving a close signal from the transceiver module, sending a control signal from the processor to an RF switch in the block, the control signal indicating an additional coupling element of the plurality of coupling elements in the block; and
   causing, by the processor, the RF switch to selectively connect the processor to the additional coupling element of the plurality of coupling elements by closing the RF switch in the block.

19. A method according to claim 18, further comprising, at the building block:
   putting the processor into a low power state after sending the control signal from the processor to the RF switch.

20. A method according to claim 18, further comprising, at the transceiver module:
   receiving an identifier for a first block;
   sending a control signal to the first block to cause the RF switch in the first block to selectively connect a coupling element connected to the processor in the first block to an additional coupling element of the plurality of coupling elements in the first block; and
   repeating the receiving and sending for any blocks adjacent to the first block, wherein the identifiers are received via the first block and the control signals are sent via the first block.

* * * * *